US012156843B2

(12) United States Patent
Wang

(10) Patent No.: US 12,156,843 B2
(45) Date of Patent: Dec. 3, 2024

(54) VOLUTE SHELL-TYPE MASSAGE STRUCTURE AND VOLUTE SHELL-TYPE MASSAGER

(71) Applicant: UC GLOBAL TRADE INC., Chino, CA (US)

(72) Inventor: Rong Wang, Chino, CA (US)

(73) Assignee: UC GLOBAL TRADE INC., Chino, CA (US)

( * ) Notice: Subject to any disclaimer, the term of this patent is extended or adjusted under 35 U.S.C. 154(b) by 0 days.

(21) Appl. No.: 18/652,845

(22) Filed: May 2, 2024

(65) Prior Publication Data

US 2024/0277562 A1 Aug. 22, 2024

(30) Foreign Application Priority Data

Apr. 16, 2024 (CN) ......................... 202410457947.9

(51) Int. Cl.
*A61H 19/00* (2006.01)

(52) U.S. Cl.
CPC ..... *A61H 19/44* (2013.01); *A61H 2201/0165* (2013.01); *A61H 2201/0207* (2013.01)

(58) Field of Classification Search
CPC ........ A61H 19/44; A61H 19/00; A61H 23/00; A61H 19/30; A61H 19/32; A61H 19/34; A61H 19/40; A61H 19/50; A61H 21/00
See application file for complete search history.

(56) References Cited

U.S. PATENT DOCUMENTS 11,382,827 B2 * 7/2022 Topolev ................. A61H 19/00
11,471,371 B2 * 10/2022 Topolev ............. A61H 23/0263

FOREIGN PATENT DOCUMENTS

EP 3498250 A1 6/2019

* cited by examiner

*Primary Examiner* — Christine H Matthews
(74) *Attorney, Agent, or Firm* — Bayramoglu Law Offices LLC

(57) ABSTRACT

A volute shell-type massage structure and a volute shell-type massager are disclosed. The volute shell-type massage structure includes a wand-type massage body; a volute shell massage body having a volute shell nose and a volute shell body; the volute shell nose is connected to the volute shell body to form a wrapping angle sector S, the volute shell nose in a wrapping angle sector S1 is continuously connected with the volute shell body, and the volute shell nose in a wrapping angle sector $S_2$ is separated from the volute shell body; and the volute shell nose is connected to the wand-type massage body to form a connecting angle $b_1$. When the volute shell body receives acting force from an outer surface of a hole-shaped part to be massaged, the volute shell nose can exert retraction force on the volute shell body, such that strong uninterrupted massage stimulation effects are achieved.

11 Claims, 10 Drawing Sheets

VOLUTE SHELL-TYPE MASSAGE STRUCTURE AND VOLUTE SHELL-TYPE MASSAGER

CROSS REFERENCE TO RELATED APPLICATIONS

This application is based upon and claims foreign priority to Chinese Patent Application No. 202410457947.9, filed on Apr. 16, 2024, the entire contents of which are incorporated herein by reference.

TECHNICAL FIELD

The present disclosure belongs to the field of massagers, relates to technology for improving stimulation effects of the massagers, and particularly relates to a volute shell-type massage structure and a volute shell-type massager.

BACKGROUND

Massage aims to achieve health, pleasure and stimulation by imposing direct action on a massaged subject, the commercial market of massagers accordingly witnesses rapid growth. Among a variety of massage products, a massage product that constructs a massage body thereof in a volute or similar structures becomes more prominent, which produces stimulating effects on a massaged part by rolling back and forth of the massage body.

In the prior art, there are many improvements to volute shell-type massagers. For example, FIGS. 1-3 illustrate a design, in which a volute shell massage body 10 is mounted at an end of a carrier 9. As the carrier 9 enters a human body, an arm body 1001 of the volute shell massage body 10 will stretch out, allowing a head portion 1002 thereof to exert some pressure on an outer surface of the human body (such as a clitoris), thereby producing dual internal and external massage stimulation effects. However, the structure above has the following problems:

since the arm body 1001 needs to, together with the carrier 9, enter the human body, a length of the arm body 1001 needs to be extended, which makes rewinding force received by the head portion 1002 difficult to be distributed evenly, thereby affecting the balance of pressure exerted on the outer surface of the human body.

Extension of the length of the arm body 1001 leads to an increase in a number of volute turns of the head portion 1002, making the head portion 1002 heavier. When the carrier 9 deviates at a certain angle, the head portion 1002 will deviate from one side of an axis of the carrier 9, resulting in gradual displacement of the massage body during the stretching process, and making it impossible to massage the intended part.

SUMMARY

In order to solve the above technical problems, the present disclosure provides a volute shell-type massage structure.

In order to achieve the above objectives, the present disclosure adopts technical solutions as follows:

the present disclosure provides a volute shell-type massage structure, including:

a wand-type massage body having a front massage end $K_1$ and a rear gripping end $K_2$;

a volute shell massage body having a volute shell nose and a volute shell body;

where the volute shell nose is an arc-shaped structure surrounding the volute shell body;

the volute shell nose is connected to the volute shell body to form a wrapping angle sector S, and a wrapping angle of the wrapping angle sector S is $\alpha$ and composed of an adjacent wrapping angle sector $S_1$ and a wrapping angle sector $S_2$;

where a wrapping angle of the wrapping angle sector $S_1$ is $\alpha_1$, a wrapping angle of the wrapping angle sector $S_2$ is $\alpha_2$, and $\alpha=\alpha_1+\alpha_2$;

where the volute shell nose in the wrapping angle sector $S_1$ is continuously connected with the volute shell body, and the volute shell nose in the wrapping angle sector $S_2$ is separated from the volute shell body;

where the volute shell nose has a free end $P_1$, and the free end $P_1$ is connected to a $K_3$ position of the wand-type massage body;

where a length of the wand-type massage body is L, in a length direction of the wand-type massage body, a length of the $K_3$ position to the front massage end $K_1$ is $L_{31}$, and a length of the $K_3$ position to the rear gripping end $K_2$ is $L_{32}$, where $L_{32}<L_{31}$, and $L=L_{31}+L_{32}$;

where the volute shell nose is connected to the wand-type massage body to form a connecting angle $b_1$, the connecting angle $b_1$ is an angle from a direction $M_1$ to a direction $M_2$, and the connecting angle $b_1$ is <90°; and where the direction $M_1$ is a direction from an axis of the volute shell nose at the free end $P_1$ pointing to a side of the volute shell nose, and the direction $M_2$ is a direction from an axis of the wand-type massage body at the free end $P_1$ pointing to the rear gripping end $K_2$.

Preferably, the wand-type massage body has a symmetrical plane $N_1$;

the volute shell massage body has a symmetrical plane $N_2$;

where the symmetrical planes $N_1$ overlaps or substantially overlaps the symmetrical plane $N_2$.

Preferably, a proportion interval of $L_{31}:L_{32}$ ranges from 5:1 to 2:1.

Preferably, a value range of the connecting angle $b_1$ is 50°-85°.

Preferably, a value range of the wrapping angle $\alpha_2$ is 70°-100°.

Preferably, a value range of the wrapping angle $\alpha_1$ is 70°-100°.

Preferably, the volute shell nose has a composite arm with a rectangular cross section;

the composite arm has a front arm $Q_1$, a rear arm $Q_2$, a first side arm $Q_3$, and a second side arm $Q_4$;

a length of a cross section of the front arm $Q_1$ and/or the rear arm $Q_2$ is $L_1$, a direction thereof is $M_3$, a thickness of the front arm $Q_1$ is $R_1$, and a thickness of the rear arm $Q_2$ is $R_2$;

a length of a cross section of the first side arm $Q_3$ and/or the second side arm $Q_4$ is $L_2$, and a thickness thereof is $R_3$; and $L_1>L_2$, and the direction $M_3$ is perpendicular to the symmetrical plane $N_2$.

Preferably, the front arm $Q_1$ has two sets of edge regions $S_3$ with a thickness of $R_{11}$, and a central region $S_4$ with a thickness of $R_{12}$, and $R_{11}=R_2=R_3$, $R_{12}<R_{11}$.

Preferably, a width of one edge region $S_3$ is defined as $L_{11}$, and a width of the central region $S_4$ is defined as $L_{12}$;

where $L_1=2*L_{11}+L_{12}$, and $1/5*L_1\leq L_{11}\leq 1/3*L_1$.

Preferably, $1/4*R_1\leq R_{12}\leq 2/3*R_1$.

Preferably, the volute shell body has a mass $G_1$;

an elastic coefficient of the volute shell nose acting on the center of the volute shell body in the direction $M_3$ is $T_1$, and an elastic coefficient in the direction $M_2$ is $T_2$;

where a value range of $T_1$ falls within 20 N/m-35 N/m; and a value range of $T_2$ falls within 18 N/m-25 N/m; and a value range of $G_1$ falls within 25 g-35 g.

Preferably, $0.5*L_1 \leq L_2 \leq 0.75*L_1$.

Preferably, a value range of L2 falls within 6 mm-10 mm.

Preferably, the volute shell body is a flying saucer-type structure or an approximately flying saucer-type structure;

where a diameter thereof ranges from 25 mm-40 mm.

Preferably, a first vibration unit is disposed inside the volute shell body for vibrating the volute shell body as a whole to provide vibration massage effects; and/or a negative pressure generating unit and a negative pressure suction port are disposed inside the volute shell body for providing negative pressure suction massage effects at the negative pressure suction port; and/or a tapping unit and/or a percussion unit are disposed inside the volute shell body for providing tapping and/or percussion massage effects on a massaged surface; and/or a first heating unit is disposed inside the volute shell body.

Preferably, a second vibration unit is disposed inside the wand-type massage body for vibrating a whole or part of the wand-type massage body to provide vibration massage effects; and/or a second heating unit is disposed inside the wand-type massage body; and/or the wand-type massage body is provided with an auxiliary massage assembly for providing various forms of massage effects.

Preferably, the auxiliary massage assembly includes:

a sliding massage ball disposed on a surface of the wand-type massage body; and/or a plurality of sliding massage balls capable of performing reciprocate relative motion;

and/or a finger-shaped kneading massage assembly; and/or a reciprocating bending driving assembly; and/or a telescopic driving assembly; and/or a pulsating percussion massage assembly; and/or a hollow tapping massage assembly.

The present disclosure further provides a volute shell-type massager, including:

the volute shell-type massage structure according to any one of the above technical solutions; and a gripping portion is disposed at the rear gripping end $K_2$ of the wand-type massage body.

The present disclosure provides a volute shell-type massage structure and a volute shell-type massager, which has the following beneficial effects:

By defining parameters, such as the length of the volute shell body, and the connecting angle with the wand-type massage body, the volute shell nose is capable of exerting retraction force on the volute shell body that always faces the outer surface of the hole-shaped part to be massaged when the volute shell body is subjected to the acting force of the outer surface of the hole-shaped part to be massaged, such that the volute shell body keeps a massage posture attached to the outer surface of the hole-shaped part to be massaged, and relatively strong and uninterrupted massage stimulation effects are accordingly achieved.

The volute shell nose allows the volute shell body to synchronously in the length direction of the wand-type massage body, such that the volute shell body can always keep the massage posture attached to the outer surface of the hole-shaped part to be massaged to perform adaptive massage actions . . . . Further, since the volute shell nose is an arc-shaped structure surrounding the volute shell body, when the volute shell body flips over, a direction of the acting force exerted by the volute shell nose on the volute shell body also gradually tends to be opposite to a direction of the acting force exerted by the outer surface of the hole-shaped part to be massaged on the volute shell body, such that the acting force is prevented from being resolved and consumed in other directions, and the acting force (directly represented as the pressure exerted on the outer surface of the hole-shaped part to be massaged) is not weakened, and a balanced effect of the actions force is finally presented.

Figure 1:
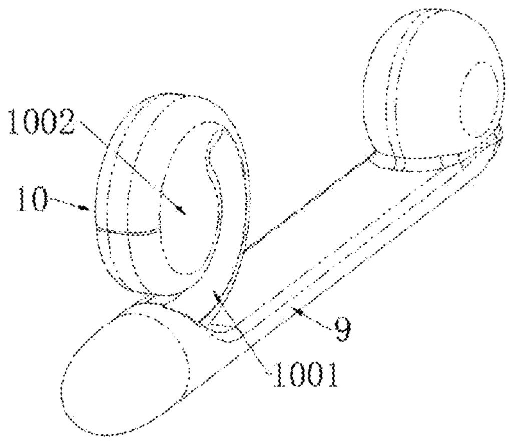
FIG. 1 (Prior Art)
FIG. 1 is a first perspective view of a volute shell-type massager according to the prior art.
Figure 2:
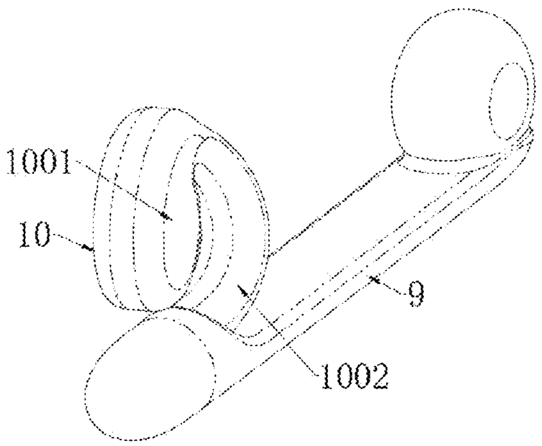
FIG. 2 (Prior Art)
FIG. 2 is a second perspective view of a volute shell-type massager according to the prior art (offset of a head portion).
Figure 3:
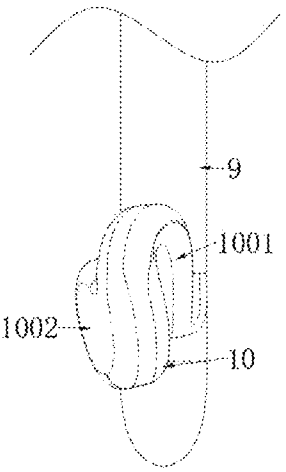
FIG. 3 (Prior Art)
FIG. 3 is a top view of a volute shell-type massager according to the prior art (offset of a head portion).
Figure 4:
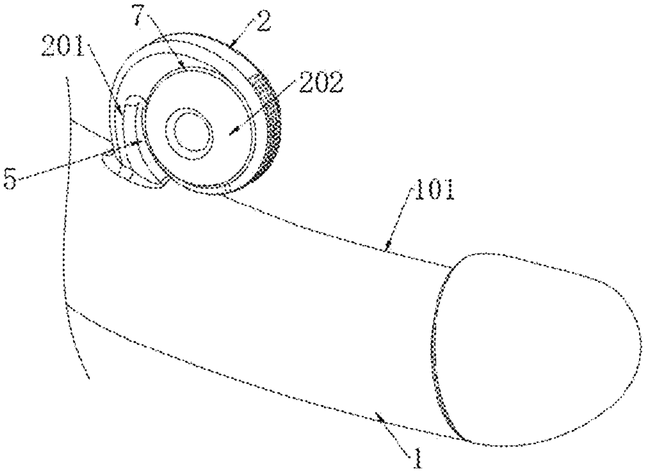
FIG. 4 is a perspective view of a volute shell-type massage structure according to the present disclosure.

Reference numerals in the accompanying drawings:

1. wand-type massage body; 101. stimulation surface; 2. volute shell massage body; 201. volute shell nose; 2011. composite arm; 202. volute shell body; 3. inner cavity of a hole-shaped part to be massaged; 4. outer surface of a hole-shaped part to be massaged; 5. gap; 6. connecting region; 7. first vibration unit; 8. negative pressure generating unit; 801. negative pressure suction port; 802. adsorption cylinder; 803. negative pressure motor; 804. connecting rod; 901. tapping unit; 902. percussion unit; 9031. linear motor; 9032. tapping head; 10. first heating unit; 1001. heating sheet; 11. second vibration unit; 12. second heating unit; 13. auxiliary massage assembly; 1301. sliding massage ball; 1302. lifting motor; 13021. cam; 1303. lifting arm; 1304. reciprocating motor; 1305. screw rod; 1306. screw sleeve; 1307. swinging motor; 1308. swinging link; 1309. reciprocating bending driving assembly; 1310. bending motor; 1311. swinging rod; 1312. telescopic driving assembly; 1313. telescopic motor; 1314. telescopic structure; 14. volute shell-type massager; and 1402. gripping portion

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

With reference to FIGS. 4-22, specific embodiments provided by the present disclosure are as follows:

as shown in FIGS. 4-7, a first embodiment of the present disclosure provides a volute shell-type massage structure, including:

a wand-type massage body 1 having a front massage end $K_1$ and a rear gripping end $K_2$;

a volute shell massage body 2 having a volute shell nose 201 and a volute shell body 202;

where the volute shell nose 201 is an arc-shaped structure surrounding the volute shell body 202;

the volute shell nose 201 is connected to the volute shell body 202 to form a wrapping angle sector S, and a wrapping angle of the wrapping angle sector S is $\alpha$ and composed of an adjacent wrapping angle sector $S_1$ and a wrapping angle sector $S_2$;

where a wrapping angle of the wrapping angle sector $S_1$ is $\alpha_1$, a wrapping angle of the wrapping angle sector $S_2$ is $\alpha_2$, and $\alpha=\alpha_1+\alpha_2$;

the volute shell nose 201 in the wrapping angle sector $S_1$ is continuously connected with the volute shell body 202, and the volute shell nose 201 in the wrapping angle sector $S_2$ is separated from the volute shell body 202;

the volute shell nose 201 has a free end $P_1$, and the free end $P_1$ is connected to a $K_3$ position of the wand-type massage body 1;

a length of the wand-type massage body 1 is L, in a length direction of the wand-type massage body 1, a length of the $K_3$ position to the front massage end $K_1$ is $L_{31}$, and a length of the $K_3$ position to the rear gripping end $K_2$ is $L_{32}$, where $L_{32}<L_{31}$, and $L=L_{31}+L_{32}$;

the volute shell nose 201 is connected to the wand-type massage body 1 to form a connecting angle $b_1$, the connecting angle $b_1$ is an angle from a direction $M_1$ to a direction $M_2$, and the connecting angle is $b_1<90°$; and the direction $M_1$ is a direction from an axis of the volute shell nose 201 at the free end $P_1$ pointing to a side of the volute shell nose 201, and the direction $M_2$ is a direction from an axis of the wand-type massage body 1 at the free end $P_1$ pointing to the rear gripping end $K_2$.

In this embodiment, the wand-type massage body 1 has a stimulation surface 101, the stimulation surface 101 is a complete circumferential outer wall surface of the wand-type massage body 1, and is configured to contact an inner cavity 3 of a hole-shaped part to be massaged when a carrier enters a human body and produce massage stimulation effects.

An end of the wand-type massage body 1 that is first inserted into the human body is the front massage end $K_1$, and one end away from the front massage end $K_1$ is the rear gripping end $K_2$ gripped by a user.

In practical use, taking the hole-shaped part to be massaged of the human body as an example, the user grips the rear gripping end $K_2$ to allow the wand-type massage body 1 to be inserted into the inner cavity 3 of the hole-shaped part to be massaged through the front massage end $K_1$, such that the stimulation surface 101 can produce massage stimulation to the inner cavity 3 of the hole-shaped part to be massaged by means of thrusting the wand-type massage body 1.

It is found on the basis of the above that when the volute shell massage body 2 is disposed at the front massage end $K_1$ or close to the front massage end $K_1$, a length of the volute shell nose 201 needs to be increased to ensure that the volute shell nose enters the human body along with the wand-type massage body 1, which will lead to the problems that massage pressure of the volute shell body 202 on an outer surface of the human body is uneven, and the volute shell body 202 is prone to deflection.

On this basis, in this embodiment, the volute shell massage body 2 is provided at the $K_3$ position, and a length $L_{32}$ from the position $K_3$ to the rear gripping end $K_2$ is less than a length $L_{31}$ from the position $K_3$ to the front massage end $K_1$, that is, the free end $P_1$ of the volute shell nose 201 is mounted at the $K_3$ position, a certain distance exists from the volute shell massage body 2 to the front massage end $K_1$, and the volute shell massage body 2 is not in contact with an outer surface 4 of the hole-shaped part to be massaged at least when the front massage end $K_1$ is inserted into the inner cavity 3 of the hole-shaped part to be massaged. Therefore, it is unnecessary to extend the length of the volute shell nose 201, thereby avoiding the problem of deflection of the volute shell body 202.

It is further found that the massage pressure exerted by the volute shell body 202 on the outer surface 4 of the hole-shaped part to be massaged needs to fall within a reasonable range. Under the condition that the massage pressure is too high, stimulation pain will be caused; and under the condition that the massage pressure is too low, massage sensation will be weakened. Further, the wand-type massage body 1 gradually enters deep into the inner cavity 3 of the hole-shaped part to be massaged, and the outer surface 4 of the hole-shaped part to be massaged is in contact with the volute shell massage body 2 until the entire period that the volute shell massage body 2 produces the massage pressure, this embodiment expects that the massage pressure is balanced, and the balanced pressure can be maintained adaptively according to a depth distance of the wand-type massage body 1.

Therefore, the volute shell nose 201 and the volute shell body 202 are further optimized:

the volute shell nose 201 and the volute shell body 202 form a continuous connection in the wrapping angle sector $S_1$, where "continuous connection" is defined as: the volute shell nose 201 forms a connecting end $P_2$ attached to a circumferential wall surface of the volute shell body 202 in shape, and the volute shell nose and the volute shell body are connected to each other on part of the circumferential wall surface of the volute shell body 202.

The above form has the advantages that: connection strength between the volute shell nose 201 and the volute shell body 202 is enhanced, and when the volute shell body 202 is in contact with the outer surface 4 of the hole-shaped part to be massaged, the connecting end $P_2$ can conduct acting force (the force exerted by the outer surface 4 of the hole-shaped part to be massaged on the volute shell body 202) to the volute shell nose 201, and the volute shell nose 201 is driven to perform action.

The volute shell nose 201 and the volute shell body 202 are separated from each other in the wrapping angle sector $S_2$, where "separated" is defined as: the volute shell nose 201 and the volute shell body 202 are in a separated state, that is, a gap 5 exists between the volute shell nose and the volute shell body, which is not a process of dynamically separating due to some acting force.

The above form has the advantages that: due to existence of the gap 5, when the volute shell body 202 is in contact with the outer surface 4 of the hole-shaped part to be massaged, the gap 5 can be compressed, such that the volute shell body 202 first performs displacement actions in the length direction of the wand-type massage body 1, thereby avoiding the problem of jamming of the volute shell body 202.

The wrapping angle $\alpha_1$ of the wrapping angle sector $S_1$ and the wrapping angle $\alpha_2$ of the wrapping angle sector $S_2$ form the wrapping angle $\alpha$ of the wrapping angle sector S.

The above form has the advantages that: the volute shell body 202 and the volute shell nose 201 form a volute structure, and when the volute shell body 202 is subjected to the acting force of the outer surface 4 of the hole-shaped part to be massaged, the volute shell nose 201 is capable of exerting retraction force on the volute shell body 202 that always faces the outer surface 4 of the hole-shaped part to be massaged, such that the volute shell body 202 keeps a massage posture attached to the outer surface 4 of the hole-shaped part to be massaged, and relatively strong and uninterrupted massage stimulation effects are accordingly achieved.

On the basis of the above, it is further found that:

First, since the inner cavity 3 of the hole-shaped part to be massaged of the user is different in depth, but what needs to be ensure is that: after the user inserts the wand-type massage body 1 to a deeper or shallower depth, the volute shell massage body 2 has a certain action stroke in the length direction of the wand-type massage body 1, thereby facilitating that the volute shell body 202 is always attached to a desired part to be massaged and to produce massage stimulation effects, preventing the volute shell body 202 from forming a barrier to the outer surface 4 of the hole-shaped part to be massaged, and accordingly avoiding the problem of insertion obstruction. Further, a difference between a maximum pressure and a minimum pressure exerted by the volute shell body 202 on the outer surface 4 of the hole-shaped part to be massaged is close to 0, that is, the pressure remains balanced rather than changes significantly.

Second, a degree of stimulation felt by the outer surface 4 of the hole-shaped part to be massaged is related to a massage form. For example, when the volute shell body 202 forms relatively static friction with the outer surface of the hole-shaped part to be massaged, the degree of stimulation will be reduced. When the volute shell body 202 forms relatively sliding or rolling friction with the outer surface of the hole-shaped part to be massaged, the degree of stimulation will be significantly improved.

Based on the above two points, the volute shell nose 201 is connected to the wand-type massage body 1 to form the connecting angle $b_1$ (the connecting angle $b_1$ is an angle from a direction $M_1$ to a direction $M_2$, and the connecting angle $b_1$ is $<90°$).

The above form has the advantages that: when interactions between the outer surface 4 of the hole-shaped part to be massaged and the volute shell body 202 is decomposed, it can be seen that, in a first stage, that is, an initial contact stage between the outer surface 4 of the hole-shaped part to be massaged and the volute shell body 202, since the volute shell body 202 and due to the existence of the gap 5, the volute shell body 202 will compress the gap 5 and move towards the rear gripping end $K_2$, in which case, the volute shell body 202 and the outer surface 4 of the hole-shaped part to be massaged form relatively static friction. In a second stage, that is, as an insertion depth increases and the gap 5 is compressed to an extreme position (that is, a value of the gap 5 is 0), the volute shell body 202 performs flipping actions by taking the connecting end $P_2$ as a flipping point, in which case, the volute shell body 202 and the outer surface 4 of the hole-shaped part to be massaged produce relatively sliding friction, such that strong massage stimulation effects are achieved. Of course, as the flipping actions is performed, the volute shell nose 201 allows the volute shell body 202 to synchronously in the length direction of the wand-type massage body 1, such that the volute shell body 202 can always keep the massage posture attached to the outer surface 4 of the hole-shaped part to be massaged to perform adaptive massage actions. Further, since the volute shell nose 201 is an arc-shaped structure surrounding the volute shell body 202, when the volute shell body 202 flips over, a direction of the acting force exerted by the volute shell nose 201 on the volute shell body 202 also gradually tends to be opposite to a direction of the acting force exerted by the outer surface 4 of the hole-shaped part to be massaged on the volute shell body 202, such that that the acting force is prevented from being resolved and consumed in other directions, and the acting force (directly represented as the pressure exerted on the outer surface 4 of the hole-shaped part to be massaged) is not weakened, and a balanced effect of the actions force is finally presented.

The above discussion is equivalent to the discussion of decomposing the actions of the volute shell body 202, and as a whole, the actions of the volute shell body 202 is equivalent to swinging actions along the free end $P_1$. Therefore, the volute shell nose 201 serves as a swinging arm, and the volute shell body 202 is accordingly allowed to perform the swinging actions; and further, since the volute shell nose 201 is an arc-shaped structure surrounding the volute shell body 202, the volute shell nose always exerts the acting force on the volute shell body 202 that faces the outer surface 4 of the hole-shaped part to be massaged, and a direction of the acting force is not perpendicular to the length direction of the wand-type massage body 1, but is parallel to or nearly parallel to the length direction of the wand-type massage body 1, such that a pressure produced by the acting force (the force on the outer surface of the hole-shaped part massage part) is balanced and cannot be decomposed and consumed, and stable massage stimulation effects are achieved.

Further, in the first stage, the volute shell nose 201 is in a retracted state, an arm length thereof is relatively short, therefore, the required resistance will increase, that is, larger acting force F1 needs to be exerted by the hole-shaped part to be massaged on the volute shell body 202. After coming to the second stage, since the gap 5 has been compressed to a minimum, greater resistance is required, that is, the acting force F1, when the volute shell body 202 is required to continue the displacement actions, however, what is expected in this embodiment is that the acting force F1 will be relatively balanced, no matter whether in the first stage or in the second stage. Therefore, the volute shell body 202 will perform the flipping actions during a swinging process, which will make the length of the volute shell nose 201 extended (specifically, the volute shell nose 201 transitions from the retracted state to an unrolled state), that is, the arm length of the swinging arm increases, such that the volute shell body 202 can be pushed to swing despite that the acting force exerted by the outer surface 4 of the hole-shaped part to be massaged on the volute shell body 202 (equivalent to a situation that a resistance arm extends, resistance is accordingly reduced) does not need to be increased, the pressure produced by the volute shell body 202 on the outer surface 4 of the hole-shaped to-be-massaged part does not increase, either (that is, the acting force F1 does not need to be increased), numerical values of changes in the pressure in the first and second phases are relatively small, and balanced and stable massage stimulation effects are finally achieved. Further, with an increase of the length of the volute shell nose 201, elastic force thereof gradually increases, which causes the acting force exerted by the outer surface 4 of the hole-shaped part to be massaged to be increased synchronously (going against the expectation of balanced acting force as devised in this embodiment), therefore, the foregoing process is beneficial to eliminating the disadvantage that the force exerted by the outer surface 4 of the hole-shaped part to be massaged needs to be increased.

Further, due to the existence of the connecting angle $b_1$, the volute shell nose 201 is allowed to further swing towards the rear gripping end $K_2$, and an action stroke of the volute shell body 202 is increased by narrowing down a value range of the connecting angle $b_1$, such that clinging massage stimulation effects are improved at different insertion depths.

Figure 8:
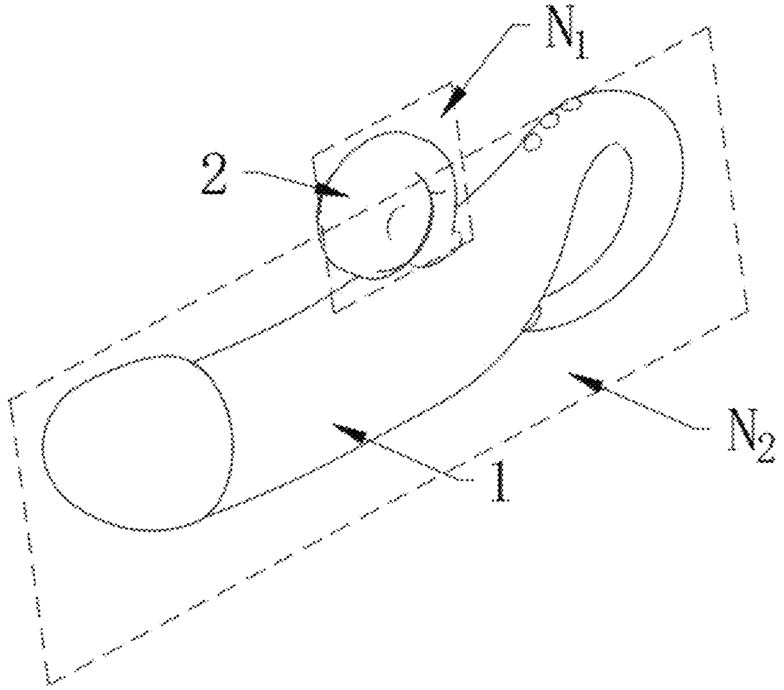
FIG. 8 is a schematic diagram of a symmetrical plane $N_1$ and a symmetrical plane $N_2$ in a volute shell-type massage structure according to the present disclosure.
Figure 9:
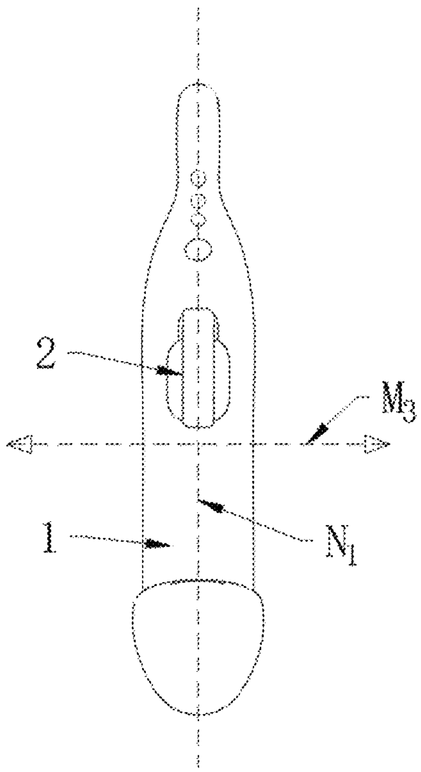
FIG. 9 is a schematic diagram of a direction $M_3$ in a volute shell-type massage structure according to the present disclosure.

As shown in FIG. 8, a second embodiment of the present disclosure provides a volute shell-type massage structure, and on the basis of the previous embodiment, the wand-type massage body 1 has a symmetrical plane $N_1$; and the volute shell massage body 2 has a symmetrical plane $N_2$, where the symmetrical planes $N_1$ overlaps or substantially overlaps the symmetrical plane $N_2$.

In this embodiment, since both the volute shell massage body 2 and the wand-type massage body 1 have symmetrical structures, their respective symmetrical planes, that is, the symmetrical plane $N_1$ and the symmetrical plane $N_2$ need to coincide with or substantially coincide with each other. That is to say, the volute shell massage body 2 is mounted on an axis of the symmetrical plane of the wand-type massage body 1, such that the volute shell-type massage structure presents a symmetrical structure in terms of appearance, and an aesthetic degree of the structure is ensured. In a structural layer, radial deviation of a mounting position of the volute shell massage body 2 is avoided, such that the volute shell massage body is in contact with a desired part to be massaged.

Figure 5:
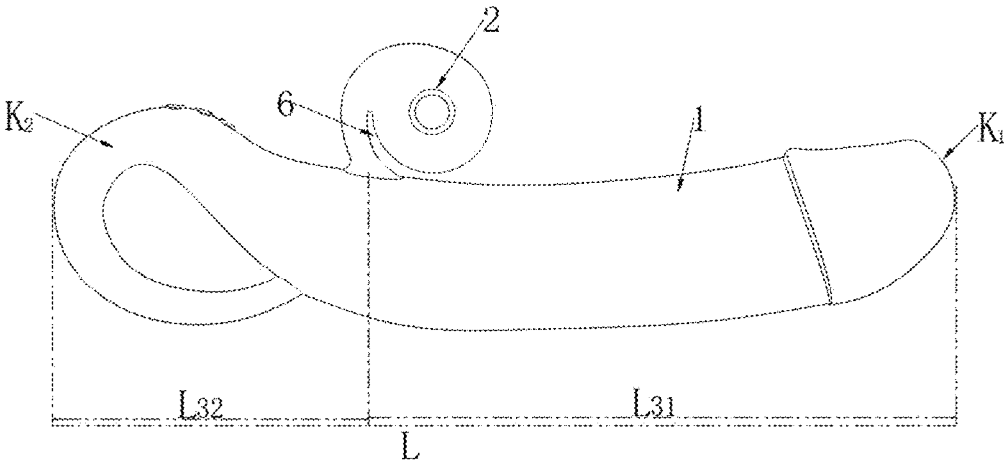
FIG. 5 is a front view of a volute shell-type massage structure according to the present disclosure.
Figure 13:
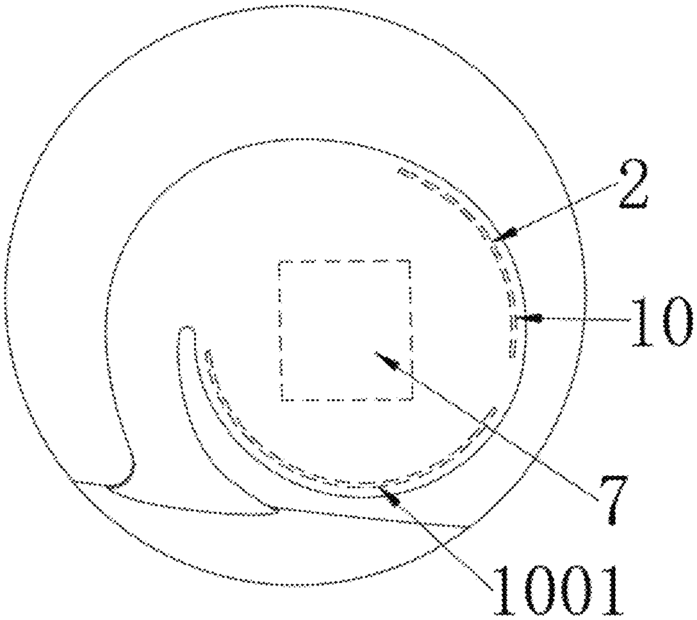
FIG. 13 is a schematic diagram of a volute shell-type massage structure equipped with a first vibration unit according to the present disclosure.
Figure 14:
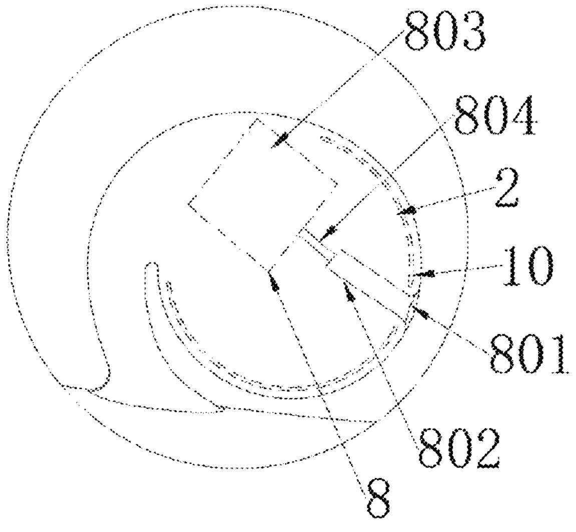
FIG. 14 is a schematic diagram of a volute shell-type massage structure equipped with a negative pressure generating unit according to the present disclosure.

As shown in FIGS. 5, 13 and 14, a third embodiment of the present disclosure provides a volute shell-type massage structure, and on the basis of the first embodiment, a proportion interval of $L_{31}$:$L_{32}$ ranges from 5:1 to 2:1.

In this embodiment, $L_{31}$:$L_{32}$ can be 5:1. Under this parameter, the volute shell massage body 2 is more prone to being close to the rear gripping end $K_2$, and when a length of $L_{31}$ is relatively long, the wand-type massage body 1 has a relatively long stimulation surface 101 for inserting into the inner cavity 3 of the hole-shaped part to be massaged, so as to provide stimulation pleasures of thrusting for the user with a deeper depth of the inner cavity 3 of the hole-shaped part to be massaged. Further, as the length of $L_{31}$ extends, a thrusting period of the wand-type massage body 1 increases, that is, a contact period between the volute shell massage body 2 and the outer surface 4 of the hole-shaped part to be massaged is increased, which provides time for relief from the stimulation sensation felt by the outer surface 4 of the hole-shaped part to be massaged, and massage stimulation is exerted again during a next contact period, such that cyclic and intermittent stimulation effects are produced on the outer surface 4 of the hole-shaped part to be massaged.

In this embodiment, $L_{31}$:$L_{32}$ can be 4:1 or 3:1. It should be noted that the proportion interval of $L_{31}$:$L_{32}$ reflects changes of the contact period between the volute shell massage body 2 and the hole-shaped part to be massaged to some extent, therefore, the user can select an adaptive range within the proportion interval according to expected needs of the user.

In this embodiment, $L_{31}$:$L_{32}$ can be 2:1. Under this parameter, the volute shell massage body 2 is more prone to being close to the front massage end $K_1$. That is to say, the length of $L_{31}$ is relatively moderate, and the volute shell massage body 2 can be in contact with the outer surface 4 of the hole-shaped part to be massaged at relatively low frequency and produce stimulation, such that relatively strong and frequent stimulation effects are achieved.

Figure 7:
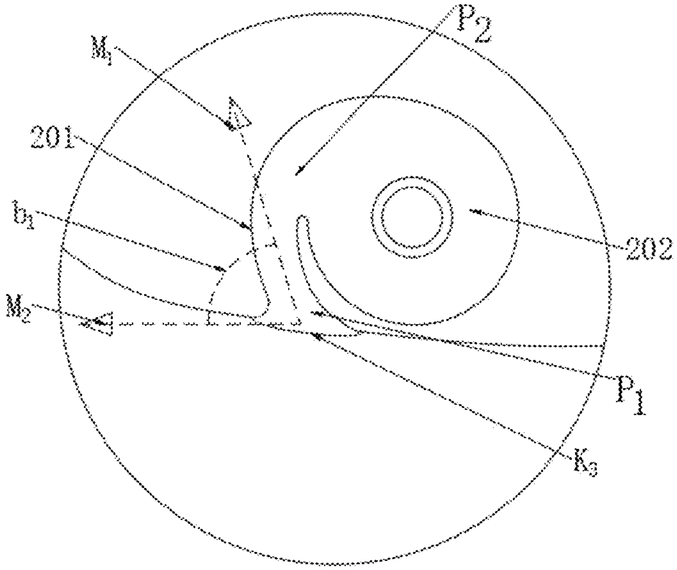
FIG. 7 is a schematic diagram of a connecting angle $b_1$ in a volute shell-type massage structure according to the present disclosure.

As shown in FIG. 7, a fourth embodiment of the present disclosure provides a volute shell-type massage structure, and on the basis of the previous embodiment, a value range of the connecting angle $b_1$ is 50°-85°.

In this embodiment, it is further found that when the value range of the connecting angle $b_1$ is 40°-10° (or even smaller), the volute shell nose 201 is inclined towards the rear gripping end $K_2$ and is close to a surface of the wand-type massage main body 1 (that is, the stimulation surface 101), therefore, a swinging amplitude of the volute shell nose 201 will be greatly limited. Specifically, when the volute shell body 202 is subjected to the acting force F1 of the outer surface 4 of the to-be-massaged part, the volute shell body will be stopped by the stimulation surface 101 after swinging to a certain angle, therefore, the volute shell body 202 cannot be driven to perform further actions, causing the volute shell body 202 stopped. Further, in order to solve the above problem, the arm length of the volute shell nose 201 needs to extended, such that a degree of deformation of the volute shell nose 201 (made from elastic material) is improved. However, as the arm length of the volute shell nose 201 extends, a risk of deflection of the volute shell body 202 will increase, therefore, it is unable to provide desired massage stimulation effects. Further, when the value of the connecting angle $b_1$ falls within 90°-130° (or even greater), the volute shell nose 201 is inclined toward the front massage end $K_1$ and is close to the surface of the wand-type massage body 1 (that is, the stimulation surface 101). Therefore, when the volute shell body 202 (made from the elastic material) is subjected to the acting force F1 exerted by the outer surface 4 of the hole-shaped part to be massaged, reactions force from the volute shell body 202 is decomposed into the acting force in the length direction of the wand-type massage body 1, and acting force perpendicular to the stimulation surface 101 and pointing to a direction of the stimulation surface 101, which cause the problem that the volute shell body 202 is incapable of flipping over and stopping further actions of the outer surface 4 of the hole-shaped part to be massaged, therefore, the acting force F1 exerted by the outer surface 4 of the hole-shaped part to be massaged needs to be continuously increased, which will cause the stimulation pain.

Figure 12:
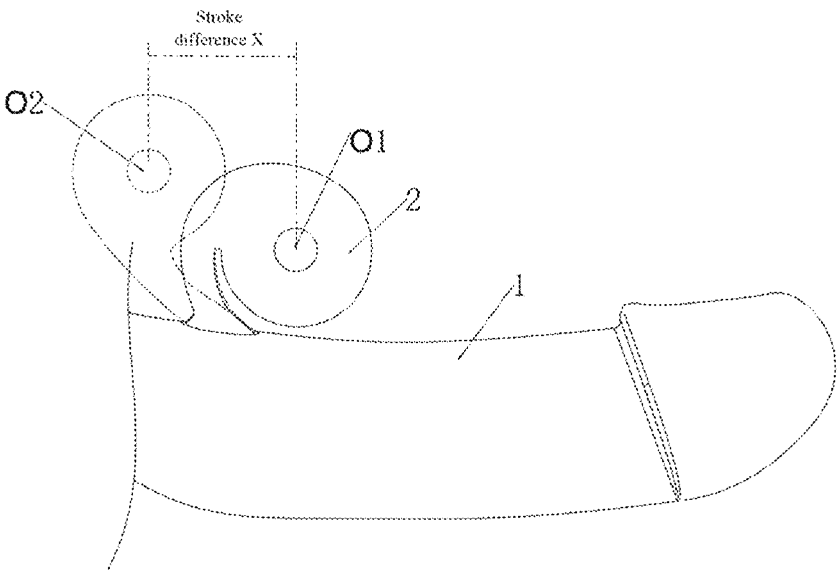
FIG. 12 is a schematic diagram of a volute shell-type massage structure according to the present disclosure from an initial position O1 to an extreme position O2.

As shown in FIG. 12, based on this, a value range of the connecting angle $b_1$ in this embodiment falls within 50°-85°, and further, the value range of the connecting angle $b_1$ is 30°-70°. Within this parameter range, it can be ensured that a stroke difference X between an initial position O1 and a maximum limit position O2 of the volute shell body 202 (a distance between a center of the volute shell body 202 in the length direction of the wand-type massage body 1) is 2 cm-6 cm (where 1 cm-3 cm is from the compression of the connecting angle $b_1$), and a value of the corresponding acting force F1 ranges from 1 N-1.5 N (which is 1 N-1.3 N in a first stage, 1.1 N-1.5 N in a second stage, and value changes in the two stages is not very great and is in a relatively balanced state). Further, the value of the acting force F1 is a magnitude of the pressure that can be withstood by the outer surface 4 of the hole-shaped part to be massaged, the stimulation sensation caused by the pressure is relatively strong, and the stimulation pain is relatively weak.

Figure 6:
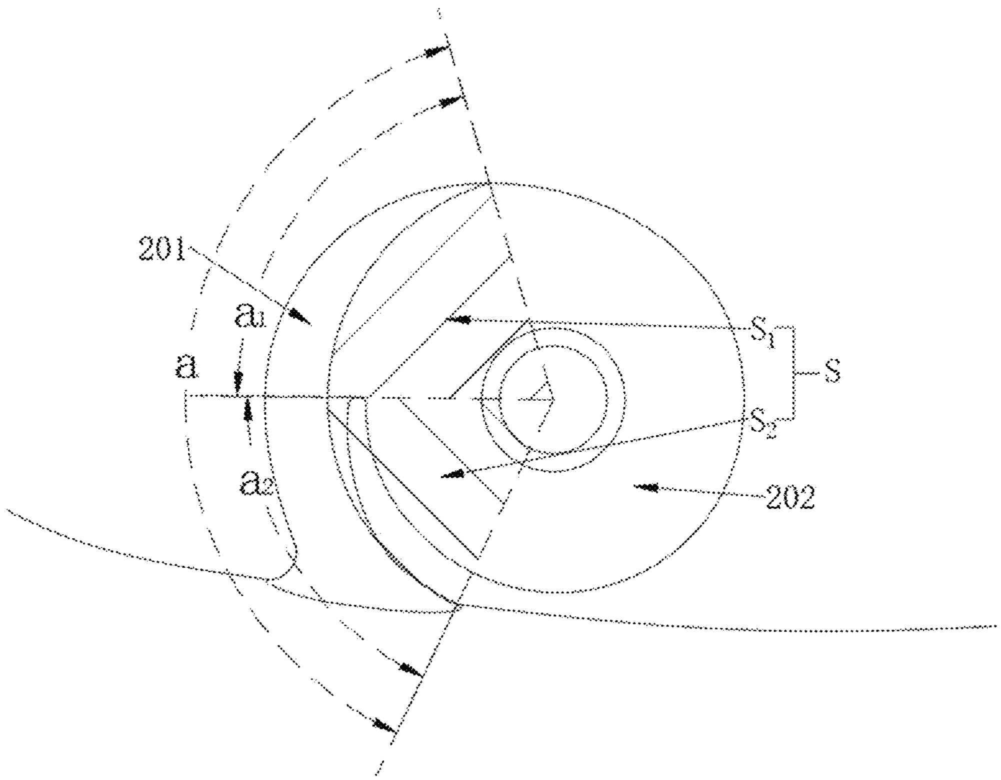
FIG. 6 is a schematic diagram of a wrapping angle $\alpha_1$ and a wrapping angle $\alpha_2$ in a volute shell-type massage structure according to the present disclosure.

As shown in FIG. 6, a fifth embodiment of the present disclosure provides a volute shell-type massage structure, and on the basis of the previous embodiment, a value range of the wrapping angle $\alpha_2$ is 70°-100°, and/or a value range of the wrapping angle $\alpha_1$ is 70°-100°.

In this embodiment, when the wrapping angle $\alpha_1$ falls within 70°-100°, it is found that the connecting region 6 of the volute shell nose 201 and the volute shell body 202 is relatively moderate; and when the acting force F1 of the outer surface 4 of the hole-shaped part to be massaged is exerted, and the connecting region 6 is relatively larger, the acting force can be quickly conducted to the volute shell nose 201, such that the volute shell nose 201 gives rapid response and drives the volute shell body 202 to perform actions, so as to achieve smooth massage stimulation actions. Further, when the connecting region 6 between the volute shell nose 201 and the volute shell body 202 is relatively small, the acting force on the connecting end $P_2$ of the volute shell nose 201 will be relatively concentrated, making a portion of the volute shell nose 201 close to the connecting end $P_2$ is prone to bending, thereby affecting the massage stimulation effects. When the value range of the wrapping angle $\alpha_2$ is relatively large, the value range of the wrapping angle $\alpha_1$ will be narrowed down. Specifically, the connecting region 6 between the volute shell nose 201 and the volute shell body 202 is relatively large, making the volute shell body 202 more difficult to flip over at the connecting end $P_2$, such that massage blockage is formed and the massage stimulation effects are reduced.

Figure 10:
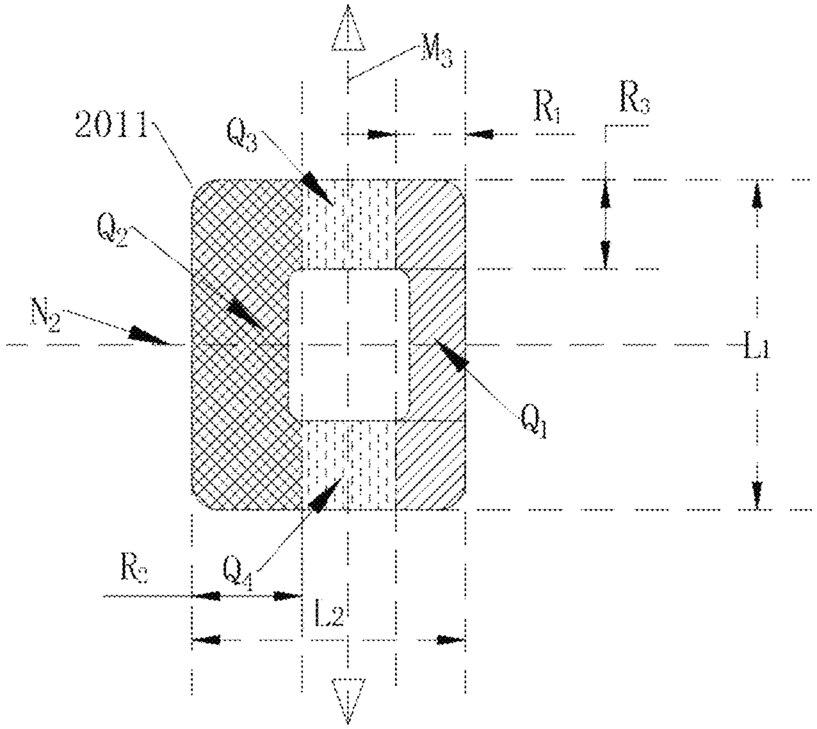
FIG. 10 is a first cross-sectional view of a composite arm in a volute shell-type massage structure according to the present disclosure ($R_1$, $R_2$, and $R_3$ are shown).
Figure 11:
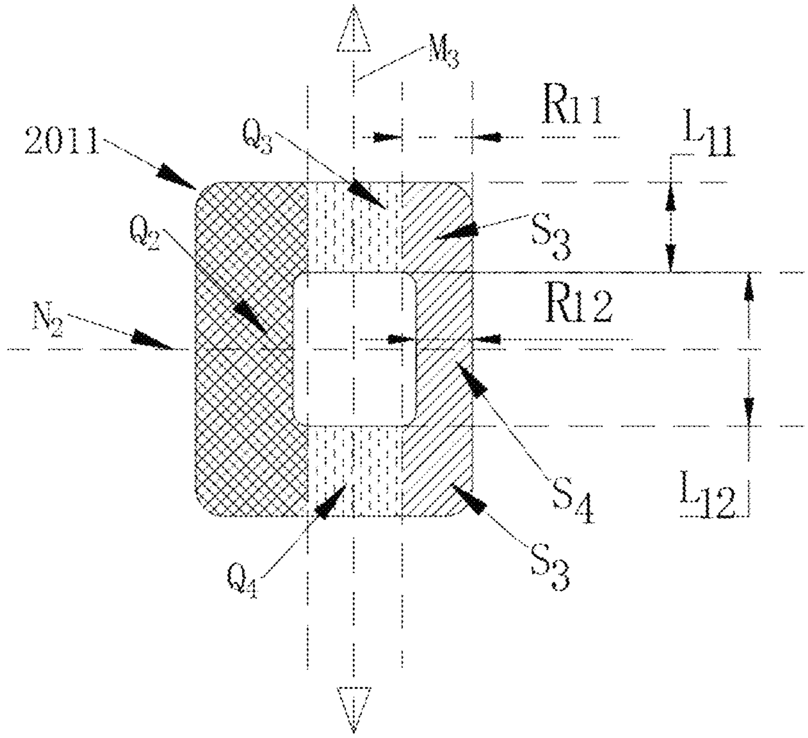
FIG. 11 is a second cross-sectional view of a composite arm in a volute shell-type massage structure according to the present disclosure ($R_{11}$, and $R_{12}$ are shown).

As shown in FIGS. 10 and 11, a sixth embodiment of the present disclosure provides a volute shell-type massage structure, and on the basis of the first embodiment, the volute shell nose 201 has a composite arm 2011 with a rectangular cross section;

the composite arm 2011 has a front arm $Q_1$, a rear arm $Q_2$, a first side arm $Q_3$, and a second side arm $Q_4$;

a length of a cross section of the front arm $Q_1$ and/or the rear arm $Q_2$ is $L_1$, a direction thereof is $M_3$, a thickness of the front arm $Q_1$ is $R_1$, and a thickness of the rear arm $Q_2$ is $R_2$;

a length of a cross section of the first side arm $Q_3$ and/or the second side arm $Q_4$ is $L_2$, and a thickness thereof is $R_3$; and $L_1>L_2$, and the direction $M_3$ is perpendicular to the symmetrical plane $N_2$.

In this embodiment, the specific structure of the volute shell nose 201 is limited.

Specifically, the front arm $Q_1$ (a wall surface falling the outer surface 4 of the hole-shaped part to be massaged) and the rear arm $Q_2$ (a wall surface facing away from the outer surface 4 of the hole-shaped part to be massaged) serve as a wall surface where the composite arm 2011 undergoes elastic deformation. Specifically, the front arm $Q_1$ and the rear arm $Q_2$ are retracted or extended to form swinging actions of the composite arm 2011, and a swinging direction needs to be in the length direction of the wand-type massage body 1. Based on this, in order to avoid deflection of the swinging direction, the first side arm $Q_3$ and the second side arm $Q_4$ are introduced to serve as a constraining wall surface for the deformation of the composite arm 2011. Specifically, the front arm $Q_1$ and the rear arm $Q_2$ are easier to deform relative to the first side arm $Q_3$ and the second side arm Q by defining $L_1>L_2$, thereby ensuring that the swing direction of the composite arm 2011 is in the length direction of the wand-type massage body 1 rather than in the length direction perpendicular to the wand-type massage body 1, and further ensuring that the volute shell body 202 can be always attached to the outer surface 4 of the hole-shaped part to be massaged and achieve stimulation massage effects.

On the basis of the above, it is further found that: degrees of deformation of the front arm $Q_1$ (a wall surface falling the outer surface 4 of the hole-shaped part to be massaged) and the rear arm $Q_2$ (a wall surface facing away from the outer surface 4 of the hole-shaped part to be massaged) are different. Specifically, the degree of deformation of the rear arm $Q_2$ is relatively small, so as to prevent the composite arm 2011 from tipping over due to excessive deformation, and provide the volute shell body 202 with acting force towards the outer surface 4 of the hole-shaped part to be massaged, thereby ensuring that the volute shell body 202 is always attached to the hole-shaped part to be massaged. The degree of deformation of the front arm $Q_1$ is relatively large, so as to ensure that the volute shell body 202 can perform flipping actions, thereby avoiding massage stoppage due to excessive constraint of the volute shell body 202. Based on this, the thickness of the front arm $Q_1$ is defined as $R_1$ and is less than the thickness $R_2$ of the rear arm $Q_2$, and a magnitude of elastic variables is affected by forming the thickness difference, so as to achieve the above beneficial effects.

Further, the front arm $Q_1$ has a relatively large magnitude of elastic deformation due to its relatively smaller wall thickness, therefore, a greater degree of elastic deformation will occur to a certain extent. However, with an increase in the elastic deformation, elastic force will also increase. Specifically, the acting force on the outer surface 4 of the hole-shaped part to be massaged is correspondingly enhanced, resulting in unbalanced stimulation effects.

Based on this, the front arm $Q_1$ has two sets of edge regions $S_3$ with a thickness of $R_{11}$, and a central region $S_4$ with a thickness of $R_{12}$, and $R_{11}=R_2=R_3$, $R_{12}<R_{11}$.

Thus, the edge regions $S_3$ and the central region $S_4$ are divided, where the edge regions $S_3$ each is a region connected to the first side wall $Q_3$ and the second side wall $Q_4$, and the central region $S_4$ is located between the edge regions $S_3$. When the thickness $R_{11}$ of one edge region $S_3$ is greater than the thickness $R_{12}$ of the central region $S_4$, the magnitudes of elastic deformation of the two regions are relatively small, such that the elastic deformation is less likely to incur, facilitating the weakening of the acting force on the outer surface 4 of the hole-shaped part to be massaged due to excessive deformation of the front arm $Q_1$. That is, the edge region $S_3$ can serve as a constraint structure of the front arm $Q_1$, and provide a certain degree of constraint in the length direction of the wand-type massage body 1, such that the volute shell nose 201 is prevented from driving the volute shell body 202 to deviate.

On the basis of the above, a width of one edge region $S_3$ is further defined as $L_{11}$, and a width of the central region $S_4$ is defined as $L_{12}$;

where $L_1=2*L_{11}+L_{12}$;

further, $⅕*L_1≤L_{12}≤⅓*L_1$; and $¼*R_1≤R_{12}≤⅔*R_1$.

When the edge region $S_3$ occupies a larger width on the front arm $Q_1$, the overall magnitude of elastic deformation of the front arm $Q_1$ will be reduced, that is, it is more difficult to undergo the elastic deformation, thereby weakening the acting force on the outer surface 4 of the hole-shaped part to be massaged, massage stimulation effects will be finally reduced. When the edge region $S_3$ occupies a smaller width on the front arm $Q_1$, the overall magnitude of elastic deformation of the front arm $Q_1$ will be increased, that is, it is relatively easy to undergo the elastic deformation, thereby resulting in a relatively low degree of constraint of the volute shell nose 201, in which case, the volute shell body 202 is easy to deviate. On this basis, Based on this, a value of the width $L_{11}$ of one edge region $S_3$ can be taken from $⅕*L_1$ to $⅓*L_1$, such as $⅕*L_1$, $¼*L_1$, $⅓*L_1$, and $0.5*L_1≤L_2≤0.75*L_1$; further, a value of $L_2$ ranges from 6 mm to 10 mm. By limiting the lengths of the front arm $Q_1$ and the rear arm $Q_2$, the acting force from 1 N to 1.5 N can be provided, since the acting force under this value is a more comfortable and acceptable force level for the human body, and based on this, it is defined that $¼*R_1≤R_{12}≤⅔*R_1$, for example, a value of $R_{12}$ can be $¼*R_1$, $⅓*R_1$, or $⅔*R_1$, with the aim of providing a desired degree of acting force in the foregoing range by limiting parameters such as the thickness and length of the front arm $Q_1$ and the rear arm $Q_2$.

A seventh embodiment of the present disclosure provides a volute shell-type massage structure, and on the basis of the previous embodiment, the volute shell body 202 has a mass $G_1$;

an elastic coefficient of the volute shell nose 201 acting on the center of the volute shell body 202 in the direction $M_3$ is $T_1$, and an elastic coefficient in the direction $M_2$ is $T_2$;

where a value range of $T_1$ falls within 20 N/m-35 N/m;

a value range of $T_2$ falls within 18 N/m-25 N/m; and a value range of $G_1$ falls within 25 g-35 g.

In this embodiment, the volute shell body 202 is a flying saucer-type structure or an approximately flying saucer-type structure;

where a diameter ranges from 25 mm-40 mm, such as 30 mm, and 35 mm. Further, in order to avoid a large displacement of the volute shell nose 201 in the direction $M_3$ (this displacement will result in the deviation of the volute shell body 202 from the outer surface 4 of the hole-shaped part to be massaged, and result in decomposition and weakening of the acting force on the outer surface 4 of the hole-shaped part to be massaged), and to ensure that the volute shell nose 201 has a desired stroke difference X (2 cm-6 cm) in the direction $M_2$, value ranges of the elastic coefficients of the volute shell nose 201 in the directions $M_3$ and $M_2$ are defined.

When a value of $T_1$ is taken from 20 N/m to 35 N/m, an offset displacement of the volute shell body 202 in the direction $M_3$ fluctuates from 0.5 cm to 1 cm, and values within the value range is allowed, this is because when the offset displacement of the volute shell body 202 in the direction $M_3$ is less than 0.5 cm, a contact area between the volute shell body 202 and the outer surface 4 of the hole-shaped part to be massaged will be relatively fixed, and a position of the contact area will not change according to changes in the magnitude and direction of the acting force exerted by the outer surface 4 of the hole-shaped part to be massaged on the volute shell body 202. Apparently, the relatively fixed contact area will reduce sliding stimulation massage effects felt by the outer surface 4 of the hole-shaped part to be massaged. On the contrary, when the offset displacement of the volute shell body 202 in the direction $M_3$ is greater than 1 cm, the volute shell body 202 will suffer a larger amplitude of offset displacement, which will weaken the acting force on the outer surface 4 of the hole-shaped part to be massaged.

Specifically, when a value of $T_2$ is taken from 20 N/m to 35 N/m, the stroke difference X of the volute shell body 202 in the direction $M_2$ satisfies the value range of 2 cm-6 cm, such that the acting force exerted by the volute shell body 202 on the outer surface 4 of the hole-shaped portion to be massaged can provide massage stimulation effects within a desired value range (1 N-1.5 N).

Figure 15:
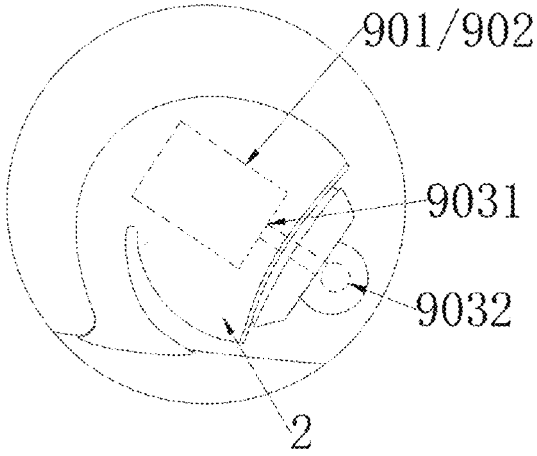
FIG. 15 is a schematic diagram of a volute shell-type massage structure equipped with a tapping unit or a percussion unit according to the present disclosure.

As shown in FIG. 5, an eighth embodiment of the present disclosure provides a volute-type massage structure, and on the basis of the previous embodiment, as shown in FIG. 13, a first vibration unit 7 is disposed inside the volute shell body 202 for vibrating the volute shell body 202 as a whole to provide vibration massage effects; and/or as shown in FIG. 14, a negative pressure generating unit 8 and a negative pressure suction port 801 are disposed inside the volute shell body 202 for providing negative pressure suction massage effects at the negative pressure suction port 801; and/or as shown in FIG. 15, a tapping unit 901 and/or a percussion unit 902 are disposed inside the volute shell body 202 for providing tapping and/or percussion massage effects on a massaged surface; and/or a first heating unit 10 is disposed inside the volute shell body 202.

In this embodiment, the volute shell body 202 exhibits various forms of massage stimulation effects.

In one of the forms, the first vibration unit 7 is disposed inside the volute shell body 202. For example, a vibration motor can be placed inside the volute shell body 202.

Figure 22:
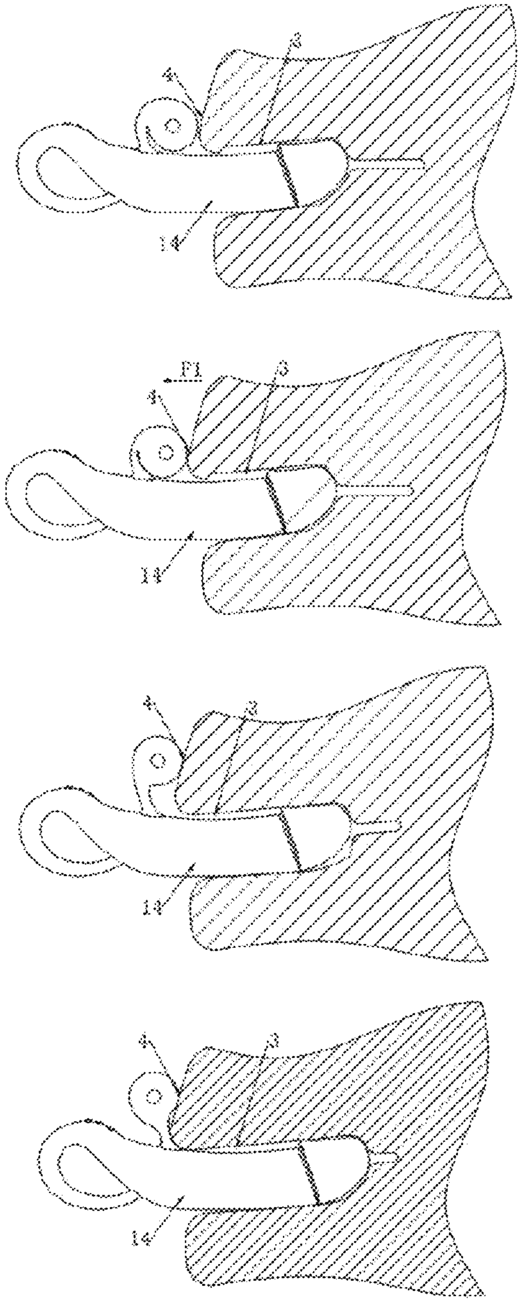
FIG. 22 is a schematic diagram of a usage process of a volute shell-type massager according to the present disclosure.

As shown in FIG. 22, the usage process is as follows: the vibration motor is started, the user inserts the wand-type massage body 1 is then inserted into the inner cavity 3 (such as a vagina) of the hole-shaped portion to be massage, the wand-type massage body 1 can be driven in a thrusting manner, the volute shell massage body 2 is in contact with the outer surface 4 (such as a clitoris or labia) of the hole-shaped part to be massaged, and the vibration motor will then produce vibrating massage stimulation effects.

As shown in FIG. 14, in one of the forms, the negative pressure generating unit 8 and the negative pressure suction port 801 are disposed inside the volute shell body 202, where the negative pressure suction port 801 is composed of a port of an adsorption cylinder 802 with elasticity made from silicone or rubber, the negative pressure suction port 801 is formed on a circumferential surface of the volute shell body 202 and faces the outer surface 4 of the hole-shaped part to be massaged, the negative pressure generation unit 8 includes a negative pressure motor 803 and a connecting rod 804, where the pressure motor 803 drives the connecting rod 804 to push a bottom of the adsorption cylinder 802 to move toward or away from the outer surface 4 of the hole-shaped part to be massaged, such that gas enters or discharges from inside of the adsorption cylinder 802, and negative pressure adsorption massage stimulation effects are produced at the negative pressure suction port 801.

The usage process thereof is the same as that of the first form, with a difference that the negative pressure suction port 801 will form an adsorption effect on the outer surface 4 of the hole-shaped part to be massaged.

As shown in FIG. 15, in one of the forms, the tapping unit 901 or the percussion unit 902 is disposed inside the volute shell body 202, where the tapping unit 901 or the percussion unit 902 is composed of a linear motor 9031 and a tapping head 9032. The linear motor 9031 is disposed inside the volute shell body 202, the tapping head 9032 is disposed at a driving end of the linear motor 9031 and extends out of the volute shell body 202, and the linear motor 9031 drives the tapping head 9032 to continuously tap or percuss the outer surface of the hole-shaped part to be massaged. It should be noted that physical structures of the tapping unit 901 and the percussion unit 902 are the same, but a working frequency of the linear motor 9031 corresponding to the tapping unit 901 is relatively low, and a size of the tapping head 9032 is relatively large to produce large-area and low-frequency tapping massage effects. However, The working frequency of the linear motor 9031 corresponding to the percussion unit 902 is relatively high, and a size of the tapping head 9032 is relatively small to produce small-area and high-frequency tapping massage effects.

The usage process thereof is the same as that of the first form, with a difference that the tapping unit 901 or the percussion unit 902 will produce tapping or percussing massage stimulation effects on the outer surface 4 of the hole-shaped part to be massaged.

Further, in any one of the above forms, the first heating unit 10, such as a heating sheet 1001, may be disposed inside the volute shell body 202 to heat the volute shell body 202.

Figure 16:
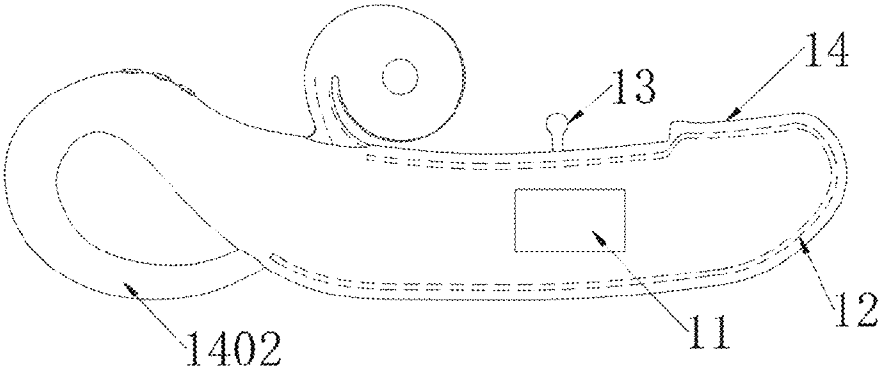
FIG. 16 is a schematic diagram of a volute shell-type massage structure equipped with a second vibration unit according to the present disclosure.

As shown in FIG. 16, a ninth embodiment of the present disclosure provides a volute-type massage structure, and on the basis of the previous embodiment, a second vibration unit 11 is disposed inside the wand-type massage body 1 for vibrating a whole or part of the wand-type massage body 1 to provide vibration massage effects; and/or as shown in FIG. 16, a second heating unit 12 is disposed inside the wand-type massage body 1; and/or in this embodiment, the wand-type massage body 1 exhibits various forms of massage stimulation effects.

In one of the forms, the second vibration unit 11 (such as a vibration motor) is disposed inside the wand-type massage body 1. Specifically, an interior of the wand-type massage body 1 is a cavity structure, and the second vibration unit 11 is placed inside the cavity to produce overall or partial vibration of the wand-type massage body 1 when the second vibration unit 11 is activated. The second heating unit 12, such as the heating sheet 1001, can be disposed inside the volute shell body 202 to heat the wand-type massage body 1.

Further, the wand-type massage body 1 is provided with an auxiliary massage assembly 13 for providing various forms of massage effects.

Figure 17:
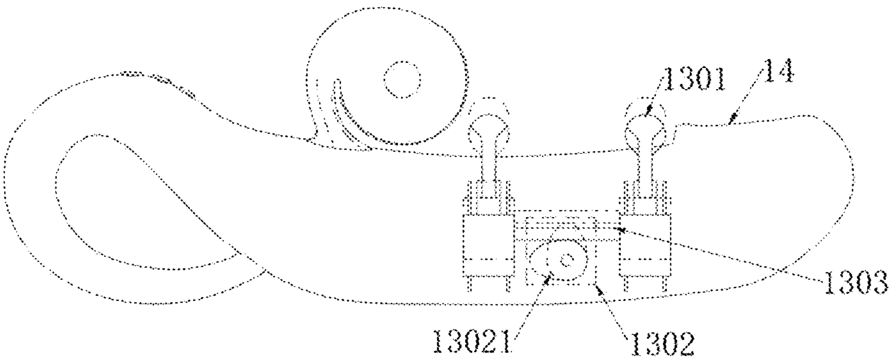
FIG. 17 is a schematic structural diagram of sliding massage balls performing lifting motion in a volute shell-type massage structure according to the present disclosure.
Figure 18:
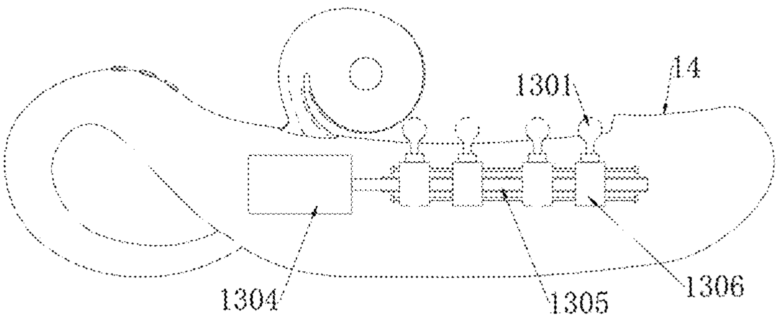
FIG. 18 is a schematic structural diagram of sliding massage balls performing linear motion in a volute shell-type massage structure according to the present disclosure.
Figure 19:
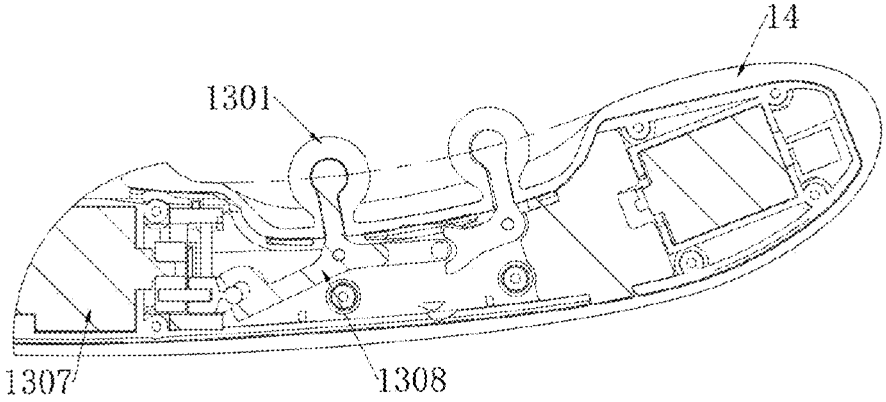
FIG. 19 is a schematic structural diagram of sliding massage balls performing swinging motion in a volute shell-type massage structure according to the present disclosure.

In one of the forms, the auxiliary massage assembly 13 is sliding massage balls 1301 disposed on a surface of the wand-type massage body 1. The sliding massage ball 1301 can be of a fixed type, so as to produce point-like massage stimulation effects on the inner cavity 3 of the hole-shaped part to be massaged;

and a plurality of sliding massage balls 1301 capable of performing reciprocate relative motion are provided, the reciprocating relative motion can be lifting motion, as shown in FIG. 17, in this form, a lifting motor 1302 is disposed inside the wand-type massage body 1, a cam 13021 connected to the lifting motor 1302, and a lifting arm 1303 abutting against the cam 13021, where the lifting arm 1303 is connected to the sliding massage balls 1301. The lifting motor 1302 drives the cam 13021 to rotate, and the lifting arm 1303 is then intermittently lifted, such that a lifting process of the sliding massage balls 1301 is implemented. Since there are many mechanisms for providing the lifting process in the prior art, details will not be described herein. The reciprocate relative motion can be liner motion in the length direction of the wand-type massage body 1, as shown in FIG. 18, in this from, a reciprocating motor 1304 is disposed inside the wand-type massage body 1, a screw rod 1305 is disposed at a driven end of the reciprocating motor 1304, the screw rod 1305 is equipped with a plurality of screw sleeves 1306, each screw sleeve 1306 is connected to sliding massage balls 1301, and the reciprocating motor 1304 drives the screw rod 1305 to rotate, such that the plurality of screw sleeves 1306 are driven to move towards each other or in the same direction, thereby producing massage stimulation effects. The reciprocating relative motion can be swinging motion, as shown in FIG. 19, in this form, a swinging motor 1307 is disposed inside the wand-type massage body 1, a swinging link 1308 is disposed at a driving end of the swinging motor 1307, the swinging link 1308 is connected to the sliding massage balls 1301, and the swinging motor 1307 is driven to drive the swinging link 1308 to further cause the sliding massage ball 1301 to perform swinging action. It should be noted that the sliding massage balls 1301 need to protrude from the surface of the wand-type massage body 1. The sliding massage balls 1301 each can be a sphere, a finger shape (the swinging actions form a finger-shaped kneading massage assembly), and the like.

Figure 20:
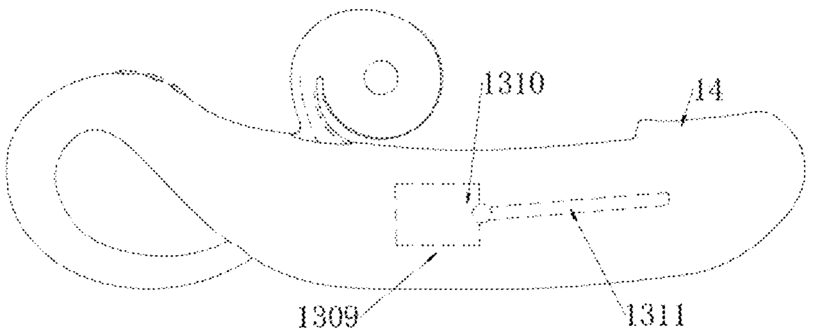
FIG. 20 is a schematic diagram of a volute shell-type massage structure equipped with a reciprocating bending driving assembly according to the present disclosure.

As shown in FIG. 20, in one of the forms, the auxiliary massage assembly 13 is a reciprocating bending driving assembly 1309. Specifically, a bending motor 1310 (a swinging motor) is disposed inside the wand-type massage body 1, a swinging rod 1311 is disposed at a driving end of the bending motor 1310, the swinging rod 1311 is disposed inside the wand-type massage body 1, and the swinging rod 1311 is driven to swing by driving the bending motor 1310, such that the wand-type massage body 1 performs reciprocating bending action.

Figure 21:
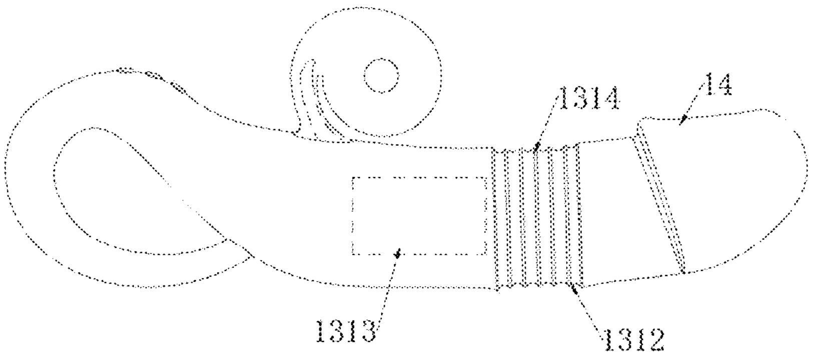
FIG. 21 is a schematic diagram of a volute shell-type massage structure equipped with a telescopic driving assembly according to the present disclosure.

As shown in FIG. 21, in one of the form, the auxiliary massage assembly 13 is a telescopic driving assembly 1312, specifically, a telescopic motor 1313 (a linear motor) is disposed inside the wand-type massage body 1, a telescopic structure 1314 is formed at a position of the wand-type massage body 1 near the front massage end $K_1$, and the telescopic structure 1314 is driven by the telescopic motor 1313 to perform telescopic action.

In one of the forms, the auxiliary massage assembly 13 is a pulsating percussion massage assembly or a hollow tapping massage assembly, and this form is the same as that of the tapping unit 901 or the percussion unit 902 disposed inside the volute shell body 202, which will not be described in detail herein. A difference is that the pulsating percussion massage assembly is disposed on the wand-type massage body 1.

A tenth embodiment of the present disclosure provides a volute shell-type massager 14, including the volute shell-type massage structure according to any one of the above embodiments; and a gripping portion 1402 is disposed at the rear gripping end $K_2$ of the wand-type massage body. The volute shell-type massager 14 provided in this embodiment has all the above beneficial effects, which will not be described in detail herein.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A volute shell massage structure, comprising:

a wand massage body having a front massage end ($K_1$) and a rear gripping end ($K_2$);

a volute shell massage body having a volute shell nose and a volute shell body; wherein the volute shell nose is an arc-shaped structure surrounding the volute shell body; and the volute shell nose is connected to the volute shell body to form a wrapping angle sector (S), a wrapping angle of the wrapping angle sector (S) is $\alpha$, and the wrapping angle sector (S) is composed of an adjacent wrapping angle sector ($S_1$) and a wrapping angle sector ($S_2$); wherein a wrapping angle of the adjacent wrapping angle sector ($S_1$) is ($\alpha_1$), a wrapping angle of the wrapping angle sector ($S_2$) is ($\alpha_2$), and $\alpha=\alpha_1+\alpha_2$; and the adjacent wrapping angle sector ($S_1$) is a first volute shell nose portion of the volute shell nose, wherein the first volute shell nose portion is connected to the volute shell body, and the wrapping angle sector ($S_2$) is a second volute shell nose portion of the volute shell nose, wherein the second volute shell nose portion is separated from the volute shell body; wherein the volute shell nose has a free end ($P_1$), and the free end ($P_1$) is connected to the wand massage body at a position ($K_3$);

a length of the wand massage body is (L), in a length direction of the wand massage body, a length from the position ($K_3$) to the front massage end ($K_1$) is ($L_{31}$), and a length from the position ($K_3$) to the rear gripping end ($K_2$) is ($L_{32}$), wherein $L_{32}<L_{31}$, and $L=L_{31}+L_{32}$;

the volute shell nose is connected to the wand massage body to form a connecting angle ($b_1$), the connecting angle ($b_1$) is an angle from a direction ($M_1$) to a direction ($M_2$), and the connecting angle ($b_1$) is <90°; and the direction ($M_1$) is a direction from an axis of the volute shell nose at the free end ($P_1$) pointing to a side of the volute shell nose, and the direction ($M_2$) is a direction from an axis of the wand massage body at the free end ($P_1$) pointing to the rear gripping end ($K_2$).

2. The volute shell massage structure according to claim 1, wherein the wand massage body has a symmetrical plane ($N_1$);

the volute shell massage body has a symmetrical plane ($N_2$); and the symmetrical plane ($N_1$) overlaps or substantially overlaps the symmetrical plane ($N_2$).

3. The volute shell massage structure according to claim 1, wherein a proportion interval of $L_{31}:L_{32}$ ranges from 5:1 to 2:1.

4. The volute shell massage structure according to claim 3, wherein a value range of the connecting angle ($b_1$) is 50°-85°.

5. The volute shell massage structure according to claim 4, wherein a value range of the wrapping angle ($\alpha_2$) is 70°-100°.

6. The volute shell massage structure according to claim 5, wherein a value range of the wrapping angle ($\alpha_1$) is 70°-100°.

7. The volute shell massage structure according to claim 2, wherein the volute shell nose has a composite arm with a rectangular cross section;

the composite arm has a front arm ($Q_1$), a rear arm ($Q_2$), a first side arm ($Q_3$), and a second side arm ($Q_4$);

a length of a cross section of the front arm ($Q_1$) and/or the rear arm ($Q_2$) is ($L_1$), a direction of the front arm ($Q_1$) and/or the rear arm ($Q_2$) from the volute shell nose is ($M_3$), a thickness of the front arm ($Q_1$) is ($R_1$), and a thickness of the rear arm ($Q_2$) is ($R_2$);

a length of a cross section of the first side arm ($Q_3$) and/or the second side arm ($Q_4$) is ($L_2$), and a thickness of the first side arm ($Q_3$) and/or the second side arm ($Q_4$) is ($R_3$); and $L_1>L_2$, and the direction ($M_3$) is perpendicular to the symmetrical plane ($N_2$).

8. The volute shell massage structure according to claim 7, wherein a first vibration unit is disposed inside the volute shell body for vibrating the volute shell body as a whole to provide vibration massage effects; and/or a negative pressure generating unit and a negative pressure suction port are disposed inside the volute shell body for providing negative pressure suction massage effects at the negative pressure suction port; and/or a tapping unit and/or a percussion unit are disposed inside the volute shell body for providing tapping and/or percussion massage effects on a massaged surface; and/or a first heating unit is disposed inside the volute shell body.

9. The volute shell massage structure according to claim 8, wherein a second vibration unit is disposed inside the wand massage body for vibrating a whole or part of the wand massage body to provide vibration massage effects; and/or a second heating unit is disposed inside the wand massage body; and/or the wand massage body is provided with an auxiliary massage assembly for providing various forms of massage effects.

10. The volute shell massage structure according to claim 9, wherein the auxiliary massage assembly comprises:

a sliding massage ball disposed on a surface of the wand massage body; and/or a plurality of sliding massage balls capable of performing reciprocate relative motion; and/or a finger-shaped kneading massage assembly; and/or a reciprocating bending driving assembly; and/or a telescopic driving assembly; and/or a pulsating percussion massage assembly; and/or a hollow tapping massage assembly.

11. A volute shell massager, comprising:

the volute shell massage structure according to claim 1, wherein a gripping portion is disposed at the rear gripping end ($K_2$) of the wand massage body.

* * * * *